(12) United States Patent
Feng et al.

(10) Patent No.: US 9,288,095 B1
(45) Date of Patent: Mar. 15, 2016

(54) SIGNAL RECEIVING SYSTEM, BAND DETECTION METHOD FOR MULTI-CARRIER SIGNAL AND DEMODULATING APPARATUS THEREOF

(71) Applicant: Novatek Microelectronics Corp., Hsinchu (TW)

(72) Inventors: Chih-Chun Feng, Hsinchu County (TW); Yung-Hua Hung, Hsinchu (TW); Yuan-Hsin Chuang, Kaohsiung (TW); Chung-Hsien Hsieh, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 14/597,228

(22) Filed: Jan. 15, 2015

(30) Foreign Application Priority Data

Nov. 18, 2014   (TW) .............................. 103139894 A (51) Int. Cl.
*H04K 1/10*   (2006.01)
*H04L 27/26*  (2006.01)

(52) U.S. Cl.
CPC ................................ *H04L 27/2649* (2013.01)

(58) Field of Classification Search
CPC ... H04L 27/2647; H04L 5/001; H04L 1/0009; H04N 5/50; H04N 21/4345; H04N 5/4401; H04B 1/7107; H04W 24/02

USPC ......... 375/148, 260, 267, 316, 340, 342, 346, 375/349; 370/208, 241, 332; 348/725–726, 348/731–732

See application file for complete search history.

(56) References Cited

U.S. PATENT DOCUMENTS

| 6,898,235 | B1 * | 5/2005  | Carlin    | H04B 1/001 342/147 |
| 2002/0101840 | A1 * | 8/2002  | Davidsson | H04L 27/2602 370/330 |
| 2005/0078225 | A1 * | 4/2005  | Yen       | H04H 40/90 348/732 |
| 2005/0097154 | A1 * | 5/2005  | Tsecouras | H04B 15/00 708/300 |
| 2010/0309388 | A1 * | 12/2010 | Kang      | H04N 5/46 348/732 |

* cited by examiner

*Primary Examiner* — Khanh C Tran
(74) *Attorney, Agent, or Firm* — Jianq Chyun IP Office (57) ABSTRACT

A signal receiving system, a band detection method for a multi-carrier signal and a demodulating apparatus thereof. Each carrier of the multi-carrier signal has a plurality of symbols respectively corresponding to a plurality of time. The band detection method includes: defining a scan area range according to a full band range of the multi-carrier signal; obtaining a reference symbol corresponding to each of the symbols according to time and frequency offset values in the scan area range; performing an operation on each of the symbols and corresponding reference symbol to obtain calibration information of each carrier of the multi-carrier signal; tuning the full band range of the multi-carrier signal according to the calibration information thereof.

17 Claims, 8 Drawing Sheets

SIGNAL RECEIVING SYSTEM, BAND DETECTION METHOD FOR MULTI-CARRIER SIGNAL AND DEMODULATING APPARATUS THEREOF

CROSS-REFERENCE TO RELATED APPLICATION

This application claims the priority benefit of Taiwan application serial no. 103139894, filed on Nov. 18, 2014. The entirety of the above-mentioned patent application is hereby incorporated by reference herein and made a part of this specification.

BACKGROUND OF THE INVENTION

1. Field of the Invention

The invention relates to a signal receiving system, a demodulation apparatus for a multi-carrier signal, and a detection method for the multi-carrier signal, and particularly relates to estimation of a band using offset values between pilot functions.

2. Description of Related Art

Through the developments of electronic technology, the bandwidth for transmitting audio and video information has increased significantly, and the request for high quality digital and audio signal transmission also increases as well.

In the conventional cable TV system, a transmission line is configured to transmit a variety of audio and video signals in a variety of formats. For example, in the conventional cable TV system, the same transmission line may need to transmit analog TV signals, Digital Video Broadcasting-Cable (DVB-C) signals with single-carrier modulation and Digital Video Broadcasting-Second Generation Cable (DVB-C2) signals with multi-carrier modulation.

For a spectrum regulation with 8 MHz (6 MHz) channel raster, the bandwidth of one DVB-C2 signal can be 8~450 MHz (6~338 MHz), which means that several DVB-C2 signals distributed at different frequencies and having different bandwidths could be simultaneously carried by the same transmission line. Thus, in the conventional technology of this technical field, a demodulating apparatus needs to be disposed at a signal receiving end to look for the bands of the transmitted signals. However, how to simply and accurately detect the bands of the carriers remains an issue for the designers in this field to work on.

SUMMARY OF THE INVENTION

The invention provides a demodulating apparatus and a band detection method for a multi-carrier signal capable of accurately detecting the band of the multi-carrier signal.

The invention also provides a signal receiving system, where a band detection method for a multi-carrier signal is capable of accurately detecting the band of the multi-carrier signal.

In a band detection method for a multi-carrier signal according to the invention, each carrier has a plurality of symbols corresponding to a plurality of time, and the method includes: defining a scan area range according to a full band range of the carriers; in the scan area range, obtaining a reference symbol corresponding to each of the symbols of each of the carriers according to a time offset value and a frequency offset value; performing an operation according to the symbols of each of the carriers and the respectively corresponding reference symbols to generate calibration information corresponding to a carrier frequency of each of the carriers; and tuning the full band range of the carriers according to the calibration information corresponding to the carriers. In addition, the time offset value and the frequency offset value are set according to pilot signals of the carriers.

According to an embodiment of the invention, the step of defining the scan area range according to the full band range of the carriers includes: defining that part or all of the full band range is the scan area range.

According to an embodiment, the time offset value is equivalent to a time interval between two adjacent symbols in each of the carriers, the two adjacent symbols being pilot signals, and the frequency offset is equal to 0.

According to an embodiment of the invention, the frequency offset value is a frequency difference between a first carrier and a second carrier having the pilot signals in the carriers, and the time offset value is a time interval between a first symbol that is the pilot signal in the first carrier and a second symbol that is the pilot signal in the second carrier.

According to an embodiment of the invention, the step of performing the operation according to the symbols of each of the carriers and the respectively corresponding reference symbols to generate the calibration information corresponding to the carrier frequency of each of the carriers includes: performing a multiplication operation on the symbols of each of the carriers and the respectively corresponding reference symbols to respectively generate a plurality of multiplication operation results; and calculating a total of the multiplication operation results to obtain the calibration information corresponding to each of the carriers.

According to an embodiment of the invention, the step of performing the operation according to the symbols of each of the carriers and the respectively corresponding reference symbols to generate the calibration information corresponding to the carrier frequency of each of the carriers includes: performing a multiplication operation on the symbols of each of the carriers and the respectively corresponding reference symbols to respectively generate a plurality of multiplication operation results; normalizing the multiplication operation results and respectively generating a plurality of normalized multiplication operation results; and calculating a total of the normalized multiplication results to obtain the calibration information corresponding to each of the carriers.

According to an embodiment of the invention, the pilot signal in the carrier is at least one of a preamble pilot signal, an edge pilot signal, a continual pilot signal, and a scattered pilot signal.

A demodulating apparatus for a multi-carrier signal according to the embodiments of the invention includes a frequency domain signal converter, a calibration information calculator and a band detector. The frequency domain signal converter receives a time-domain input signal and converts the input signal into a plurality of frequency-domain carriers. The calibration information calculator is coupled to the frequency domain signal converter and receives the frequency-domain carriers. In addition, the calibration information calculator is configured to perform operations as follows: defining a scan area range according to a full band range of the carriers; in the scan area range, obtaining a reference symbol corresponding to each of the symbols of each of the carriers according to a time offset value and a frequency offset value; performing an operation according to the symbols of each of the carriers and the respectively corresponding reference symbols to generate calibration information corresponding to a carrier frequency of each of the carriers. The band detector is coupled to the calibration information calculator and tunes the full band range of the carriers according to the calibration information corresponding to the carriers. In addition, the time offset value and the frequency offset value are set according to pilot signals of the carriers.

Furthermore, a signal receiving system according to the embodiments of the invention includes the demodulating apparatus for the multi-carrier signal, a tuner, and a band controller. The tuner is coupled to the demodulating apparatus for the multi-carrier signal, tunes a radio frequency signal according to a set band to generate and provide a signal at an intermediate frequency or a zero intermediate frequency to the demodulating apparatus for the multi-carrier signal. The band controller is coupled to the tuner and the demodulating apparatus for the multi-carrier signal and generates the set band according to the full band range.

In view of the foregoing, the demodulating apparatus for the multi-carrier signal according to the embodiments of the invention scans the carriers according to the time and frequency offset values and calculates the calibration information according to the reference symbols corresponding to the symbols of each of the carriers, and tunes the full band range of the multi-carrier signal according to the calibration information. Thus, in the invention, by checking the time and frequency offset values between the pilot signals of the multi-carrier signals, the full band range of the multi-carrier signal is obtained and an effective calibration operation is performed.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
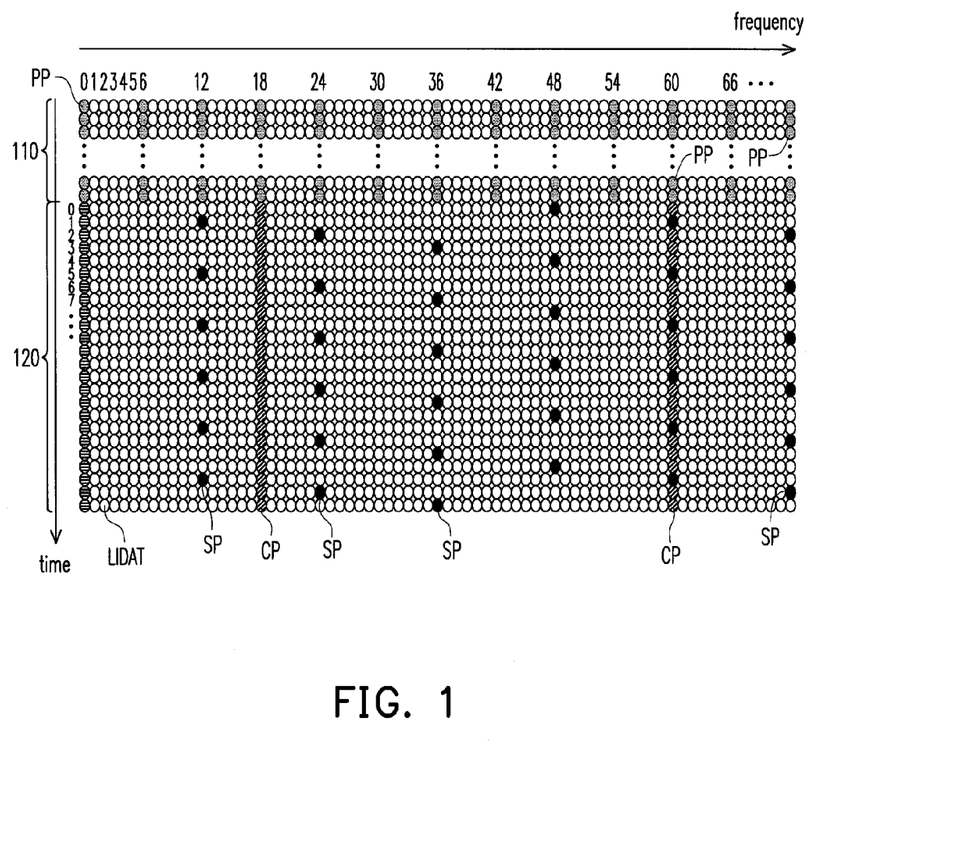
FIG. 1 is a schematic view illustrating a distribution of symbols of Digital Video Broadcasting-Second Generation Cable (DVB-C2) signals according to an embodiment of the invention.

Referring to FIG. 1, FIG. 1 is a schematic view illustrating a distribution of symbols of Digital Video Broadcasting-Second Generation Cable (DVB-C2) signals according to an embodiment of the invention. The horizontal axis of FIG. 1 indicates frequencies, and the vertical axis indicates time. Those indicated in a region 110 are preamble symbols, while those indicated in a region 120 are data symbols. In addition, the preamble symbols in the region 110 include a plurality of preamble pilot signals PP (patterns having the same shading as that of the preamble pilot signal PP shown in FIG. 1 are all preamble pilot signals), and the data symbols in the region 120 include a plurality of scattered pilot signals SP, a plurality of continual pilot signals CP, and a plurality of edge pilot signals EP (patterns having the same shading as that of the scattered signal SP are all scattered pilot signals, patterns having the same shading as that of the continual pilot signal CP are all continual pilot signals, and patterns having the same shading of the edge pilot signal are all edge pilot signal). In addition, hollow circles in FIG. 1 represent data symbols L1DAT that are not pilot signals.

Based on FIG. 1, it can be known that in the signals of DVB-C2 format, the preamble pilot signals PP, the scattered pilot signals SP, the continual pilot signals CP, and the edge pilot signals EP are distributed at relatively fixed positions on the time axis and the frequency axis. Thus, regardless of the preamble pilot signals PP, the scattered pilot signals SP, the continual pilot signals CP, and the edge pilot signals, there is a fixed frequency difference and time interval between two pilot signals. Thus, detection of the frequency difference and the time interval between two pilot signals in the multi-carrier signal may serve as basis of band detection of the DVB-C2 signal.

Figure 2:
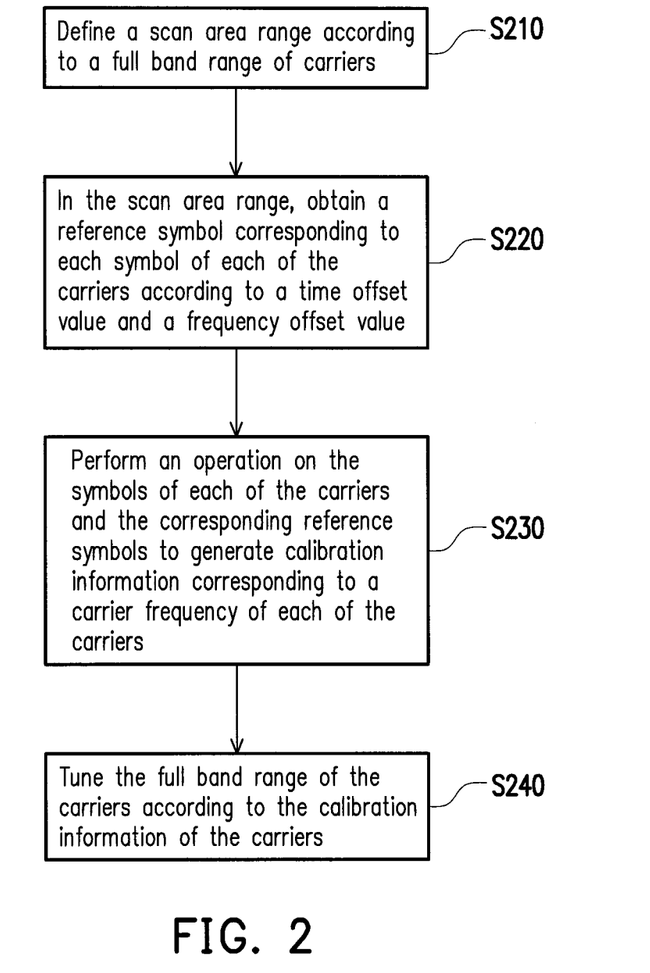
FIG. 2 is a flowchart illustrating a band detection method for a multi-carrier signal according to an embodiment of the invention.

FIG. 2 is a flowchart illustrating a band detection method for a multi-carrier signal according to an embodiment of the invention. Details are now described below with reference to the description above and FIG. 2. At Step S210, a scan area range is defined according to a full band range of the multi-carrier signal. In addition, at Step S220, a scanning operation is performed in the defined scan area range according to predetermined time and frequency offset values to obtain a reference symbol corresponding to each carrier. Specifically, each symbol of each carrier in the scan area range is scanned at Step S220 to look for the reference symbol having the predetermined time and frequency offset values with respect to the scanned symbol.

It should be noted that the time offset value and the frequency offset value are set according to the frequency difference and the time interval between two predetermined pilot signals in the DVB-C2 signal. Briefly, the time offset value and the frequency offset value are respectively set based on the time interval and frequency difference between one pilot signal of the preamble pilot signals PP, the scattered pilot signals SP, the continual pilot signals, and the edge pilot signals EP and another pilot signal of the preamble pilot signals PP, the scattered pilot signals SP, the continual pilot signals, and the edge pilot signals EP. Taking FIG. 1 as an example, if two continuous preamble pilots of the preamble pilot signals PP corresponding to frequency 0 in the region 110 are chosen, for example, the time offset value and the frequency offset value may be respectively set as 1 and 0. Besides, if the lowermost scattered pilot signal SP corresponding to frequency 12 and the scattered pilot signal SP corresponding to frequency 24 at the lower right are chosen, for example, the time offset value and the frequency offset value may be respectively set as 1 and 12.

Then, at Step S230, an operation is performed on the symbols of each of the carriers and the reference symbol corresponding to each of the symbols obtained through scanning, so as to obtain calibration information corresponding to a carrier frequency of each of the carriers. Specifically, when at least one of the scanned symbol and the corresponding reference symbol is not a symbol of the pilot signal, an operation (e.g. correlation) is performed on the scanned symbol and the corresponding reference symbol to obtain a first result. Alternatively, if the scanned symbol and the corresponding reference symbol are the symbols of the pilot signals, an operation (e.g. correlation) is performed on the scanned symbol and the corresponding reference symbol to obtain a second result. Since the symbols of the pilot signals are more related, the first result is certainly less than the second result. Thus, by looking for differences between a plurality of results obtained in the operation performed at Step S230, the symbols of the pilot signals in the DVB-C2 signal in the scan area range may be correctly located.

In the embodiments of the invention, the multiplication results of conjugate complex numbers of the scanned symbols and the corresponding reference symbols may be added up according to the frequencies to obtain the calibration information. In addition, frequencies having the symbols of the pilot signals that are chosen in the scanning operation are found according to a plurality of the calibration information respectively corresponding to the plurality of frequencies. Specifically, calibration information Cor[k] of each frequency k (subcarrier number) may be calculated according to an formula (1) below:

$$Cor[k] = \sum_{l} Y_{l,k} \cdot Y^*_{l+Dy,k+Dx} \quad (1)$$

In formula (1), l is time (symbol number), and Y refers to a frequency domain symbol corresponding to a received signal, Dx is the frequency offset value, and Dy is the time offset value.

In addition, the calibration information Cor[k] may be further normalized, so as to improve reliability of the calibration information. Under such circumstance, the calibration information Cor[k] may be calculated according to an formula (2) below:

$$Cor[k] = \sum_{l} \frac{Y_{l,k} \cdot 1 Y^*_{l+Dy,k+Dx}}{|Y_{l,k}| \cdot |Y_{l+Dy,k+Dx}|} \quad (2)$$

Lastly, at Step S240, the full band range of the carriers is tuned according to the calibration information. Briefly, in the embodiments of the invention, information about the band of the DVB-C2 signal is obtained by making use of the calibration information corresponding to frequencies having the operation results of the operation higher than a preset value, as well as the predetermined time and frequency offset values, thereby tuning the full band range of the carriers.

It should also be noted that, the scanning operation at Step 230 may be executed anytime. Thus, Step S240 may be dynamically performed to tune the full band range of the carriers according to the latest calibration information.

In the following, several embodiments are provided to describe details for practicing the band detection method for the multi-carrier signal according to the embodiments of the invention.

Figure 3A:
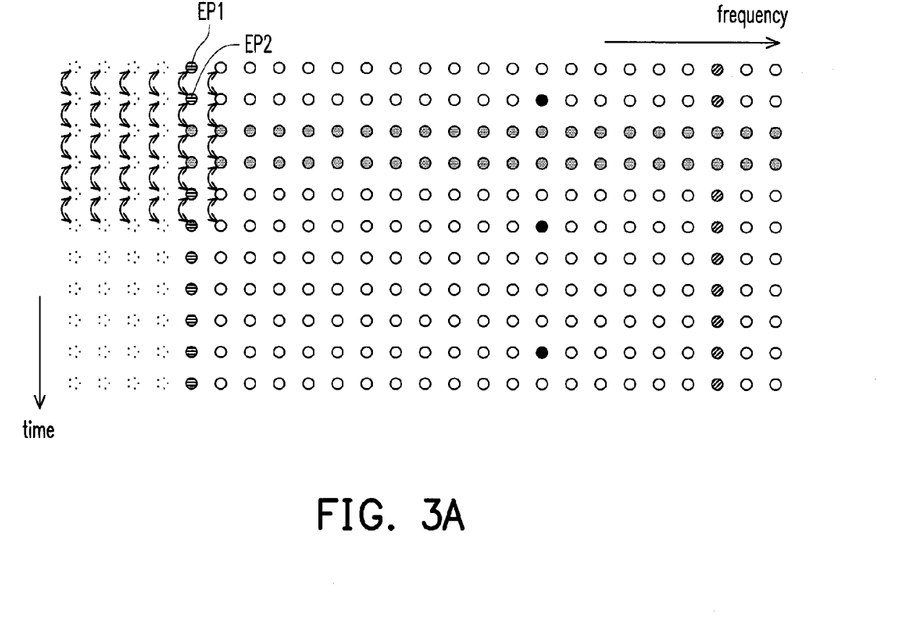
FIGS. 3A to 3D are schematic views illustrating a first embodiment of the band detection method for the multi-carrier signal according to an embodiment of the invention.

Referring to FIGS. 3A to 3D, FIGS. 3A to 3D are schematic views illustrating a first embodiment of a band detection method for a multi-carrier signal according to an embodiment of the invention. In FIG. 3A, the frequency offset value and the time offset value are set by choosing symbols of edge pilot signals EP1 and EP2. In addition, the frequency offset value Dx of the edge pilot signals EP1 and EP2 is equal to 0, and the time offset value Dy is equal to 1.

Figure 3B:
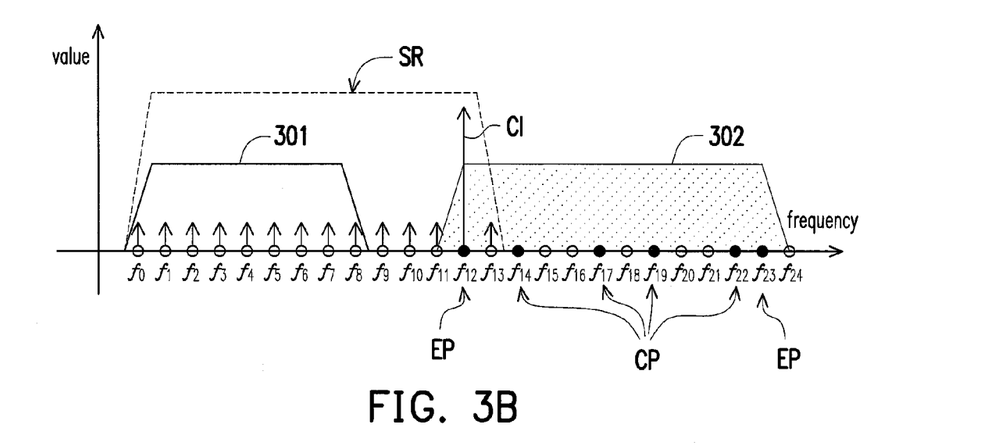

Then, in FIG. 3B, in a defined scan area range SR, the scanning operation according to the predetermined time offset value (Dy=1) and the preset frequency offset value (Dx=0) is performed to obtain the reference symbols of each of the carriers. In addition, the scan area range SR includes part of a frequency range of a DVB-C2 signal 302, and also includes most of a frequency range of another signal 301.

In addition, in the DVB-C2 signal 302, the edge pilot signals EP are distributed at frequencies $f_{12}$ and $f_{23}$, and the continual pilot signals CP are distributed at frequencies $f_{14}$, $f_{17}$, $f_{19}$, and $f_{22}$.

Through the scanning operation, the calibration information corresponding to operation results of frequencies $f_0$ to $f_{13}$ is obtained. In addition, since the edge pilot signals EP1 and EP2 are distributed in symbols at the frequency $f_{12}$, a value of an operation result CI corresponding to the frequency 12 is higher. Thus, it is determined that a left edge of a band of the DVB-C2 signal 302 is at the frequency $f_{12}$.

Figure 3C:
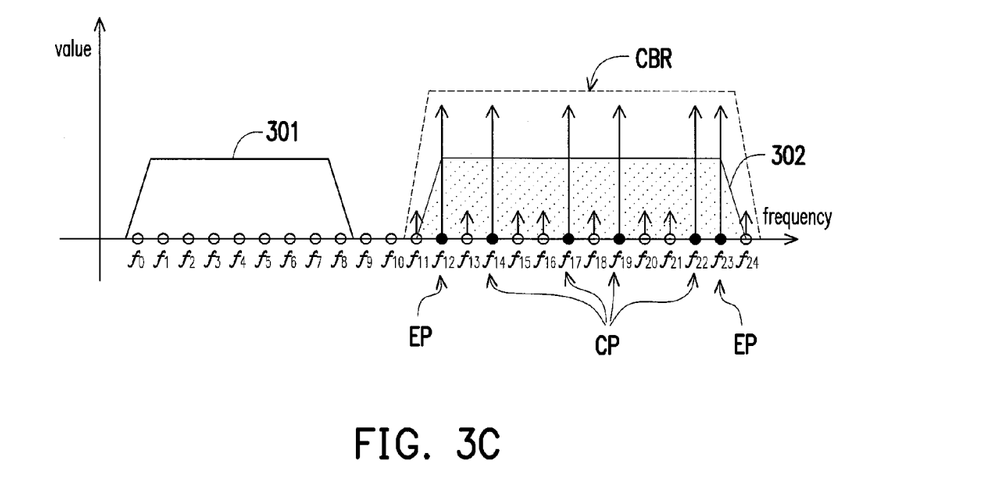

With the information, the left edge of the band of the DVB-C2 signal 302 is confirmed. In addition, as illustrated in FIG. 3C, a correct full band range CBR of the DVB-C2 signal 302 is consequently obtained as well.

Figure 3D:
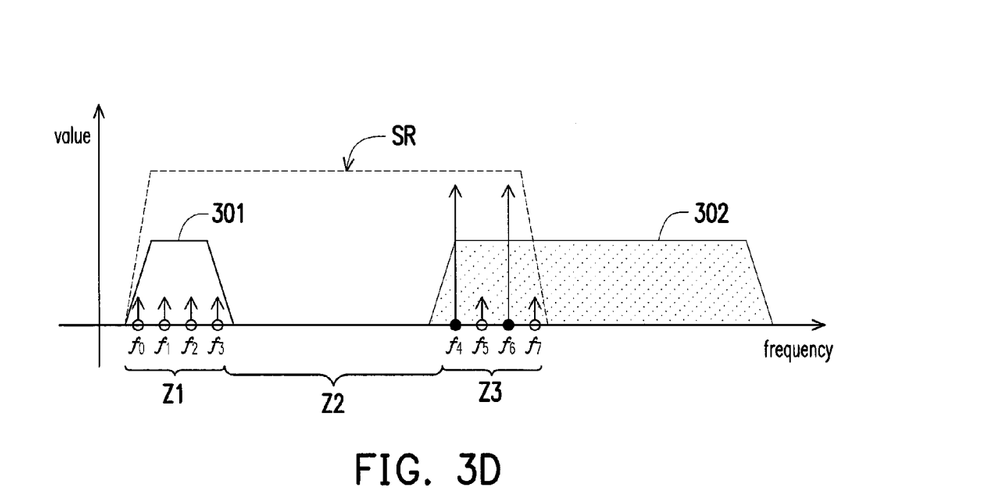

Referring to FIG. 3D, in this embodiment, when the scanning operation is performed to the scan area range SR, not all of the frequencies in the scan area range SR need to be scanned. In FIG. 3D, the scanning operation may be performed in a frequency range Z1 of the another signal 301 having the data symbols and a frequency range Z3 of the DVB-C2 signal 302 in the scan range, and a frequency range Z2 that does not carry any signal energy may not be scanned. Thus, the scanning operation according to the embodiments of the invention may be more efficient and a computation load is further reduced.

Figure 4A:
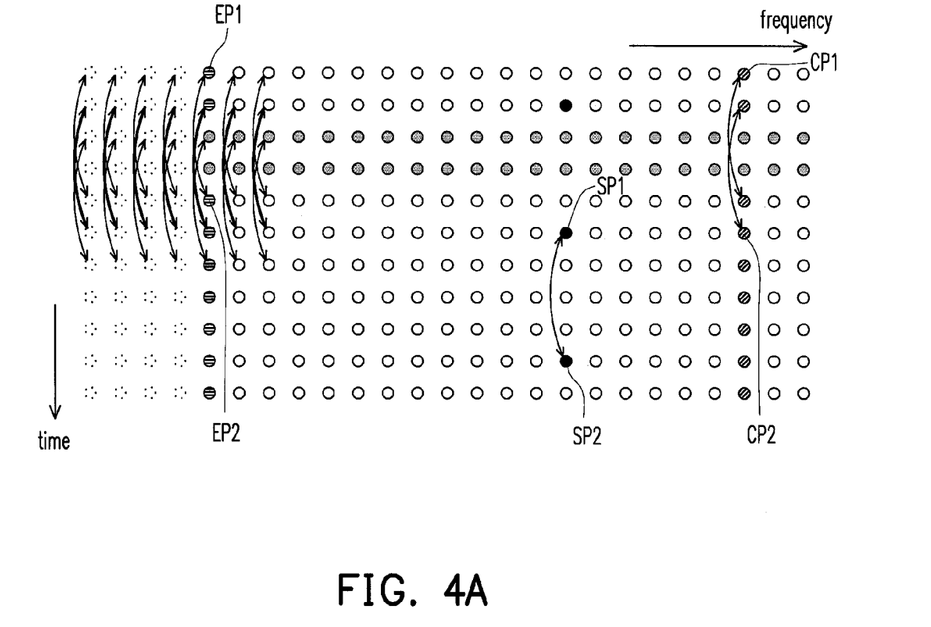
FIGS. 4A to 4C are schematic views illustrating a second embodiment of the band detection method for the multi-carrier signal according to an embodiment of the invention.
Figure 4B:
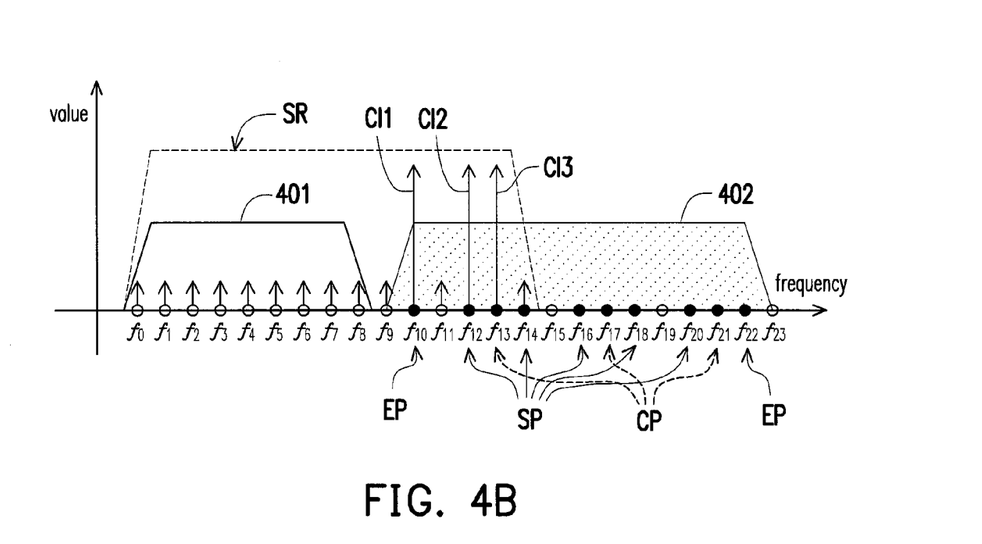
Figure 4C:
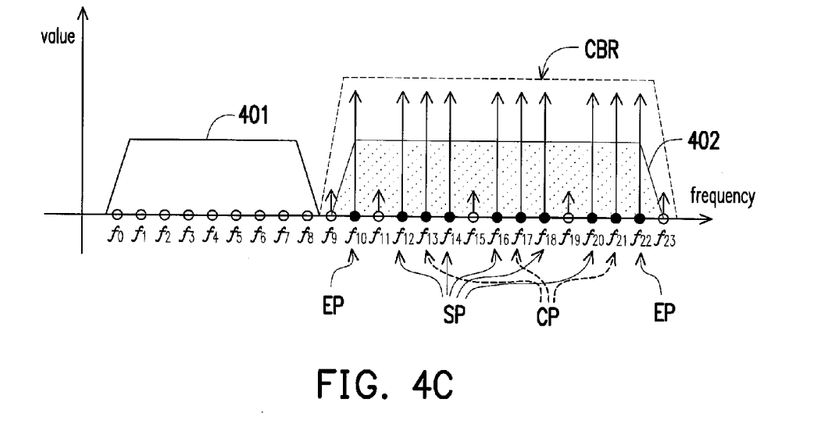

Referring to FIGS. 4A to 4C, FIGS. 4A to 4C are schematic views illustrating a second embodiment of the band detection method for the multi-carrier signal according to an embodiment of the invention. In FIG. 4A, the frequency offset value and the time offset value are set by choosing the symbols of the edge pilot signals EP1 and EP2. Alternatively, symbols of continual pilot signals CP1 and CP2 may be chosen to set the frequency offset value and the time offset value, or symbols of scattered pilot signals SP1 and SP2 may be chosen to set the frequency offset value and the time offset value. In addition, the frequency offset value Dx is equal to 0 and the time offset value Dy is equal to 4.

Then, in FIG. 4B, in the defined scan area range SR, the scanning operation according to the predetermined time offset value (Dy=4) and the preset frequency offset value (Dx=0) is performed to obtain the reference symbols of each of the carriers. In addition, the scan area range SR includes part of a frequency range of a DVB-C2 signal 402, and also includes most of a frequency range of another signal 401.

It should also be noted that in the DVB-C2 signal 402, the edge pilot signals EP are distributed at the frequencies $f_{10}$ and $f_{22}$, the scattered pilot signals SP are distributed at the frequencies $f_{12}$, $f_{14}$, $f_{16}$, $f_{18}$, and $f_{20}$, and the continual pilot signals CP are distributed at the frequencies $f_{13}$, $f_{17}$, and $f_{21}$.

Through the scanning operation, calibration information corresponding to operation results of frequencies $f_0$ to $f_{14}$ is obtained. In addition, since the edge pilot signals EP1 and EP2 are distributed in symbols at the frequency $f_{10}$, the scattered pilot signals SP1 and SP2 are distributed in symbols at the frequency $f_{12}$, and the continual pilot signals CP1 and CP2 are distributed in symbols at the frequency $f_{13}$, values of operation results CI1, CI2, and CI3 respectively corresponding to the frequencies $f_{10}$, $f_{12}$, and $f_{13}$ are greater, and a full band range of the DVB-C2 signal 402 may thus be determined.

With the information, the left edge of the band of the DVB-C2 signal 402 is confirmed. In addition, as illustrated in FIG. 4C, the correct full band range CBR of the DVB-C2 signal 402 is consequently obtained as well.

Figure 5A:
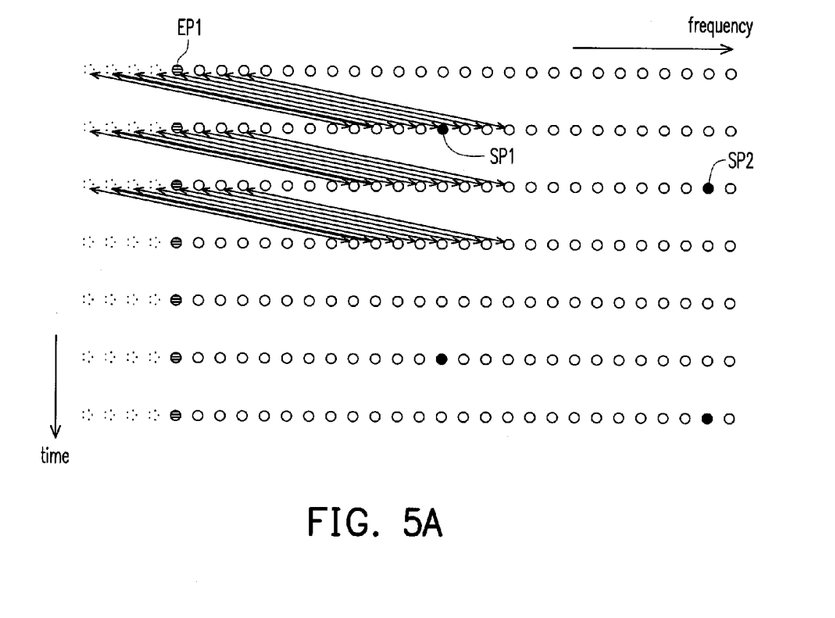
FIGS. 5A to 5C are schematic views illustrating a third embodiment of the band detection method for the multi-carrier signal according to an embodiment of the invention.
Figure 5B:
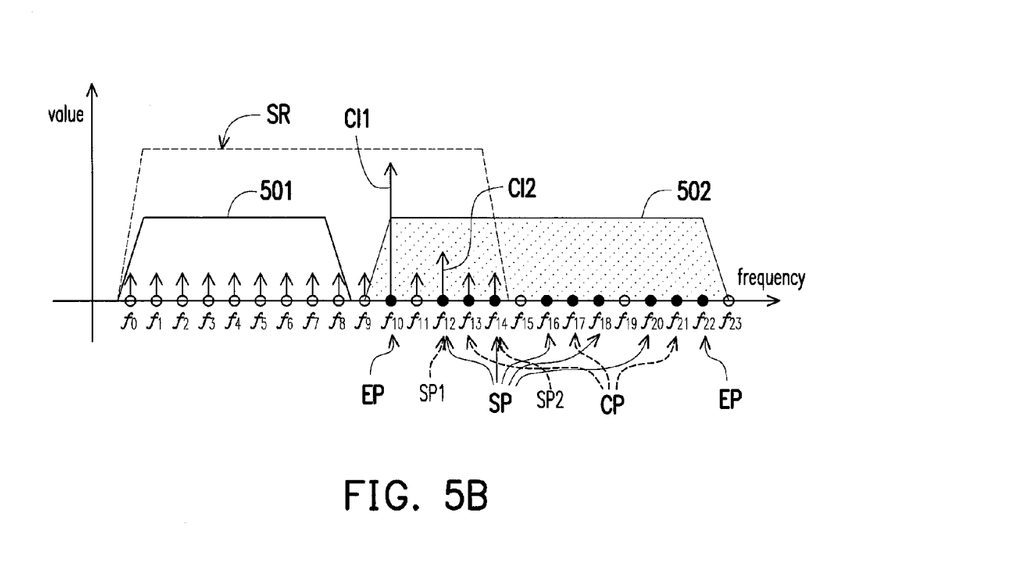
Figure 5C:
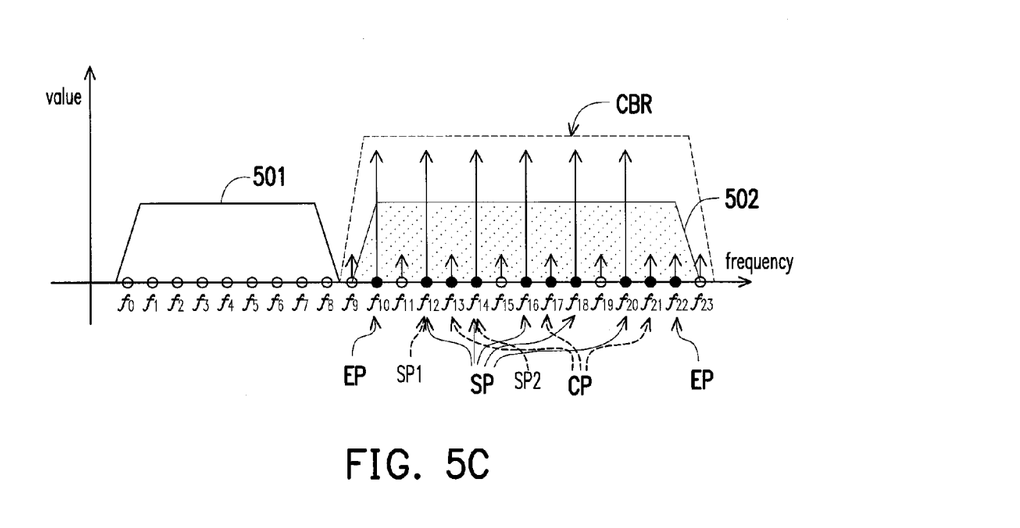

Referring to FIGS. 5A to 5C, FIGS. 5A to 5C are schematic views illustrating a third embodiment of the band detection method for the multi-carrier signal according to an embodiment of the invention. In FIG. 5A, the frequency offset value and the time offset value are set by choosing the symbols of the edge pilot signal EP1 and the scattered pilot signal SP1. Alternatively, the symbols of the scattered pilot signals SP1 and SP2 may be chosen to set the frequency offset value and the time offset value. In addition, the frequency offset value Dx is equal to 12 and the time offset value Dy is equal to 1.

Then, in FIG. 5B, in the defined scan area range SR, the scanning operation according to the predetermined time offset value (Dy=12) and the preset frequency offset value (Dx=1) is performed to obtain the reference symbols of each of the carriers. In addition, the scan area range SR includes part of a frequency range of a DVB-C2 signal 502, and also includes most of a frequency range of another signal 501.

It should also be noted that in the DVB-C2 signal 502, the edge pilot signals EP are distributed at the frequencies $f_{10}$ and $f_{22}$, the scattered pilot signals SP are distributed at the frequencies $f_{12}$, $f_{14}$, $f_{16}$, $f_{15}$, and $f_{20}$, and the continual pilot signals CP are distributed at the frequencies $f_{13}$, $f_{17}$, and $f_{21}$.

Through the scanning operation, the calibration information corresponding to the operation results of the frequencies $f_0$ to $f_{14}$ is obtained. In addition, since the edge pilot signal EP1 and the scattered pilot signal SP1 are respectively distributed in the symbols of the frequencies $f_{10}$ and $f_{12}$, and the scattered pilot signals SP1 and SP2 are respectively distributed in the symbols of the frequencies $f_{12}$ and $f_{14}$, the operation results CI1 and CI2 corresponding to the frequencies $f_{10}$ and $f_{12}$ are greater, and a full band range of the DVB-C2 signal 502 may be thus determined.

With the information, the left edge of the band of the DVB-C2 signal 502 is confirmed. In addition, as illustrated in FIG. 5C, the correct full band range CBR of the DVB-C2 signal 502 is consequently obtained as well.

Figure 6:
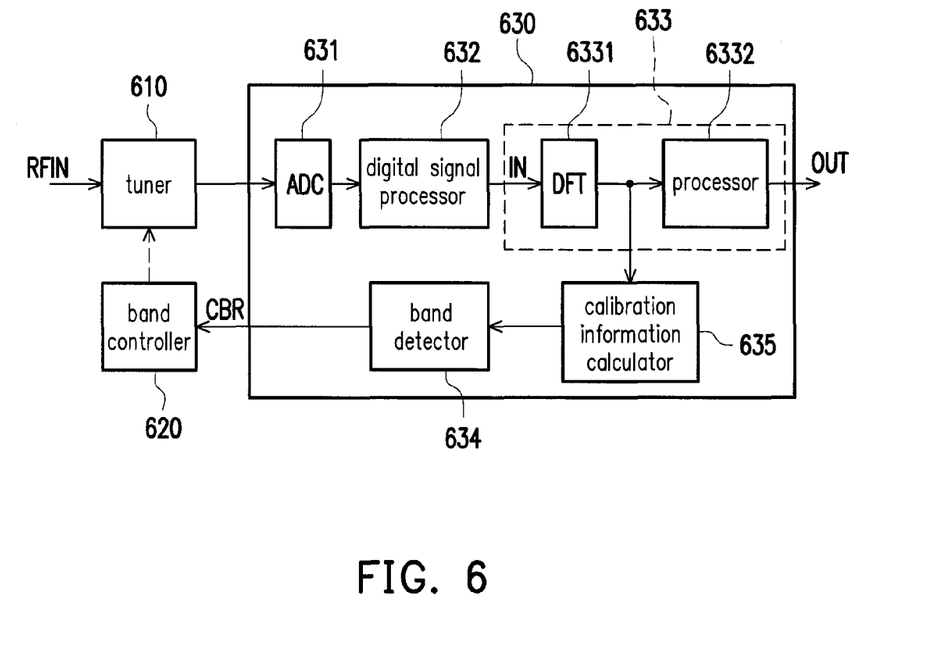
FIG. 6 is a schematic view illustrating a signal receiving system according to an embodiment of the invention.

Referring to FIG. 6, FIG. 6 is a schematic view illustrating a signal receiving system according to an embodiment of the invention. A signal receiving system 600 includes a tuner 610, a band controller 620, and a multi-carrier signal demodulating apparatus 630. The tuner 610 is coupled to the demodulating apparatus 630 for the multi-carrier signal, and tunes a radio frequency signal RFIN according to a set band, so as to generate a tuned signal at an intermediate frequency or a zero intermediate frequency and provide the tuned signal to the demodulating apparatus 630 for the multi-carrier signal. The band controller 620 is coupled to the tuner 610 and the demodulating apparatus 630 for the multi-carrier signal, so as to generate the set band according to the full band range CBR provided by the demodulating apparatus 630 for the multi-carrier signal.

The demodulating apparatus 630 for the multi-carrier signal includes an analog-to-digital converter (ADC) 631, a digital signal processor 632, a frequency domain signal converter 633, a band detector 634, and a calibration information calculator 635. The ADC 631 receives the tuned signal at the intermediate or zero intermediate frequency, and converts the tuned signal into a digital time domain input signal. The digital signal processor 632 is coupled to the ADC 631, performs a digital signal processing operation on the time domain input signal, and provides a processed digital signal to the frequency domain signal converter 633.

The frequency domain signal converter 633 includes a discrete Fourier transformer (DFT) 6331 and a processor 6332. The DFT 6331 receives a time domain input signal IN and converts the time domain input signal IN to generate a frequency domain multi-carrier signal. The processor 6332 performs a frequency domain process (e.g., a channel equalization process, etc.) on the multi-carrier signal and generates a demodulated output signal OUT.

The frequency domain signal converter 633 receives the time domain input signal IN and converts the time domain input signal IN into a plurality of carriers of a frequency domain. The calibration information calculator 635 is coupled to the frequency domain signal converter 633 and receives the carriers provided by the frequency domain signal converter 633. In addition, the calibration information calculator 635 is configured to perform operations such as: (1) defining the scan area range according to the full band range of the carriers; (2) in the scan area range, obtaining the reference symbol corresponding to each of the symbols of each of the carriers according to the time offset value and the frequency offset value; and (3) performing the operation according to the symbols and the respectively corresponding reference symbols of each of the carriers to generate the calibration information corresponding to the carrier frequency of each of the carriers.

Details regarding the operations performed by the calibration information calculator 635 are already described in detail in the preceding paragraphs. Therefore, details in this respect are not reiterated below.

The frequency band detector 634 is coupled to the calibration information calculator 635, and tunes the full band range CBR of the multi-carrier signal according to the calibration information corresponding to the carriers.

In view of the foregoing, in the invention, the time offset value and the frequency offset value between the pilot signals in the multi-carrier signal are used to scan the carriers, so as to find the correct frequencies of the pilot signals in the multi-carrier signal. In addition, the full band range of the multi-carrier signal is found according to the frequencies of the pilot signals, thereby tuning the band. In this way, the band of the multi-carrier signal is dynamically and accurately detected, and signal demodulation is performed more accurately, thereby ensuring the signal quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A band detection method for a multi-carrier signal, wherein each carrier has a plurality of symbols corresponding to a plurality of time, the method comprising:
   defining a scan area range according to a full band range of the carriers;
   obtaining a reference symbol corresponding to each of the symbols of each of the carriers in the scan area range according to a time offset value and a frequency offset value;
   performing an operation according to the symbols of each of the carriers and the respectively corresponding reference symbols to generate calibration information corresponding to a carrier frequency of each of the carriers; and tuning the full band range of the carriers according to the calibration information corresponding to the carriers, wherein the time offset value and the frequency offset value are set according to pilot signals of the carriers.

2. The band detection method for the multi-carrier signal as claimed in claim 1, wherein the step of defining the scan area range according to the full band range of the carriers comprises:

defining a part or all of the full band range as the scan area range.

3. The band detection method for the multi-carrier signal as claimed in claim 1, wherein the time offset value is equivalent to a time interval between two adjacent symbols in each of the carriers, the two adjacent symbols are the pilot signals, and the frequency offset is equivalent to 0.

4. The band detection method for the multi-carrier signal as claimed in claim 1, wherein the frequency offset value is a frequency difference between a first carrier and a second carrier having the pilot signals in the carriers, and the time offset value is a time interval between a first symbol which is the pilot signal in the first carrier and a second symbol which is the pilot signal in the second carrier.

5. The band detection method for the multi-carrier signal as claimed in claim 1, wherein the step of performing the operation according to the symbols of each of the carriers and the respectively corresponding reference symbols to generate the calibration information corresponding to the carrier frequency of each of the carriers comprises:

performing a multiplication operation on the symbols of each of the carriers and the respectively corresponding reference symbols to respectively generate a plurality of multiplication operation results; and calculating a total amount of the multiplication operation results to obtain the calibration information corresponding to each of the carriers.

6. The band detection method for the multi-carrier signal as claimed in claim 1, wherein the step of performing the operation according to the symbols of each of the carriers and the respectively corresponding reference symbols to generate the calibration information corresponding to the carrier frequency of each of the carriers comprises:

performing a multiplication operation on the symbols of each of the carriers and the respectively corresponding reference symbols to respectively generate a plurality of multiplication operation results;

normalizing the multiplication operation results and respectively generating a plurality of normalized multiplication operation results; and calculating a total amount of the normalized multiplication results to obtain the calibration information corresponding to each of the carriers.

7. The band detection method for the multi-carrier signal as claimed in claim 1, wherein the pilot signal in the carrier is at least one of a preamble pilot signal, an edge pilot signal, a continual pilot signal, and a scattered pilot signal.

8. A demodulating apparatus for a multi-carrier signal, comprising:

a frequency domain signal converter, receiving an input signal and converting the input signal to a plurality of carriers of a frequency domain;

a calibration information calculator, coupled to the frequency domain signal converter and receiving the carriers, wherein the calibration information calculator is configured to perform operations as follows:

defining a scan area range according to a full band range of the carriers;

obtaining a reference symbol corresponding to each of the symbols of each of the carriers in the scan area range according to a time offset value and a frequency offset value;

performing an operation according to the symbols of each of the carriers and the respectively corresponding reference symbols to generate calibration information corresponding to a carrier frequency of each of the carriers; and a band detector, coupled to the calibration information calculator and tuning the full band range of the carriers according to the calibration information corresponding to the carriers, wherein the time offset value and the frequency offset value are set according to pilot signals of the carriers.

9. The demodulating apparatus for the multi-carrier signal as claimed in claim 8, wherein the calibration information calculator further defines that part or all of the full band range is the scan area range.

10. The demodulating apparatus for the multi-carrier signal as claimed in claim 8, wherein the time offset value is equivalent to a time interval between two adjacent symbols in each of the carriers, the two adjacent symbols being the pilot signals, and the frequency offset is equal to 0.

11. The demodulating apparatus for the multi-carrier signal as claimed in claim 8, wherein the frequency offset value is a frequency difference between a first carrier and a second carrier having the pilot signals in the carriers, and the time offset value is a time interval between a first symbol that is the pilot signal in the first carrier and a second symbol that is the pilot signal in the second carrier.

12. The demodulating apparatus for the multi-carrier signal as claimed in claim 8, wherein the calibration information calculator performs a multiplication operation on the symbols of each of the carriers and the respectively corresponding reference symbols for respectively generating a plurality of multiplication operation results, and the calibration information calculator calculates a total amount of the multiplication operation results to obtain the calibration information corresponding to each of the carriers.

13. The demodulating apparatus for the multi-carrier signal as claimed in claim 8, wherein the calibration information calculator performs a multiplication operation on the symbols of each of the carriers and the respectively corresponding reference symbols, respectively generates a plurality of multiplication operation results, normalizes the multiplication operation results, respectively generates a plurality of normalized multiplication operation results, and calculates a total of the normalized multiplication operation results to obtain the calibration information corresponding to each of the carriers.

14. The demodulating apparatus for the multi-carrier signal as claimed in claim 8, wherein the pilot signal in the carrier is at least one of a preamble pilot signal, an edge pilot signal, a continual pilot signal, and a scattered pilot signal.

15. The demodulating apparatus for the multi-carrier signal as claimed in claim 8, further comprising:

an analog-to-digital signal converter, receiving a tuned radio frequency signal and converting the tuned radio frequency signal which is an analog signal into a digital input signal; and a digital signal processor, coupled to the analog-to-digital signal converter, performing a digital signal processing operation on the input signal, and providing the processed digital signal to the frequency domain signal converter.

16. The demodulating apparatus for the multi-carrier signal as claimed in claim 8, wherein the frequency domain signal converter comprises:
- a discrete Fourier signal converter, receiving the input signal and converting the input signal to generate the carriers; and
- a processor, processing the carriers and generating a demodulated output signal.

17. A signal receiving system, comprising:
- the demodulating apparatus for the multi-carrier signal as claimed in claim 8;
- a tuner, coupled to the demodulating apparatus for the multi-carrier signal, tuning a radio frequency signal according to a set band to generate and provide the tuned signal to the demodulating apparatus for the multi-carrier signal; and
- a band controller, coupled to the tuner and the demodulating apparatus for the multi-carrier signal and generating the set band according to the full band range.

* * * * *